United States Patent
Tung et al.

(10) Patent No.: US 11,636,337 B2
(45) Date of Patent: Apr. 25, 2023

(54) SYSTEM AND METHOD FOR KNOWLEDGE DISTILLATION BETWEEN NEURAL NETWORKS

(71) Applicant: ROYAL BANK OF CANADA, Toronto (CA)

(72) Inventors: Frederick Tung, Vancouver (CA); Gregory Mori, Vancouver (CA)

(73) Assignee: ROYAL BANK OF CANADA, Montreal (CA)

( * ) Notice: Subject to any disclaimer, the term of this patent is extended or adjusted under 35 U.S.C. 154(b) by 423 days.

(21) Appl. No.: 16/825,012

(22) Filed: Mar. 20, 2020

(65) Prior Publication Data

US 2020/0302295 A1 Sep. 24, 2020

Related U.S. Application Data

(60) Provisional application No. 62/822,099, filed on Mar. 22, 2019.

(51) Int. Cl.
| | |
|---|---|
| *G06N 3/08* | (2006.01) |
| *G06F 17/18* | (2006.01) |
| *G06F 17/16* | (2006.01) |
| *G06N 3/04* | (2006.01) |
| *G06K 9/00* | (2022.01) |
| *G06N 3/02* | (2006.01) |

(52) U.S. Cl.
CPC ............. *G06N 3/08* (2013.01); *G06F 17/16* (2013.01); *G06F 17/18* (2013.01); *G06K 9/00* (2013.01); *G06N 3/02* (2013.01); *G06N 3/0454* (2013.01)

(58) Field of Classification Search
CPC .......... G06N 3/08; G06N 3/02; G06N 3/0454; G06N 20/00; G06N 5/046; G06N 5/022; G06N 20/10; G06F 17/16; G06F 17/18; G06K 9/00; G06K 9/6256; G06K 9/6224; G06K 9/6269; G06K 9/6296; G10L 15/063; G10L 15/16
See application file for complete search history.

(56) References Cited

U.S. PATENT DOCUMENTS

| | | | | |
|---|---|---|---|---|
| 10,885,900 | B2 * | 1/2021 | Li | G06N 3/084 |
| 10,963,748 | B1 * | 3/2021 | Tulyakov | G06N 3/0472 |
| 2019/0205748 | A1 * | 7/2019 | Fukuda | G06N 3/0454 |
| 2020/0175384 | A1 * | 6/2020 | Zhang | G06N 3/0454 |
| 2020/0272905 | A1 * | 8/2020 | Saripalli | H03M 7/70 |

* cited by examiner

*Primary Examiner* — Mohammad K Islam
(74) *Attorney, Agent, or Firm* — Norton Rose Fulbright Canada LLP (57) ABSTRACT

Systems and methods for knowledge distillation provide supervised training of a student network with a teacher network, including inputting a batch to the teacher network, inputting the batch to the student network, generating a teacher activation map at a layer of the teacher network, generating a student activation map at a layer of the student network corresponding to the layer of the teacher network, generating a pairwise teacher similarity matrix based on the teacher activation map, generating a pairwise student similarity matrix based on the student activation map, and minimizing a knowledge distillation loss defined as a difference between the pairwise teacher similarity matrix and the pairwise student similarity matrix.

20 Claims, 10 Drawing Sheets

| Student | Teacher | Student | KD | AT | SP (ours) | Teacher |
|---|---|---|---|---|---|---|
| WideResNet-16-1 (0.2M) | WideResNet-40-1 (0.6M) | 8.74 | 8.48 | 8.30 | 8.13 | 6.51 |
| WideResNet-16-1 (0.2M) | WideResNet-16-2 (0.7M) | 8.24 | 7.96 | 8.25 | 7.92 | 6.07 |
| WideResNet-16-2 (0.7M) | WideResNet-40-2 (2.2M) | 6.07 | 6.08 | 5.88 | 5.52 | 5.18 |
| WideResNet-40-1 (0.6M) | WideResNet-16-8 (11.0M) | 6.07 | 5.63 | 5.57 | 5.34 | 4.33 |
| WideResNet-40-2 (2.2M) | WideResNet-16-8 (11.0M) | 5.18 | 4.86 | 4.47 | 4.55 | 4.34 |

Table 2

FIG. 6

| Student | Teacher | Student | AT | SP | Teacher |
|---|---|---|---|---|---|
| MobileNet-0.25 (0.3M) | MobileNet-0.5 (0.8M) | 42.45 | 42.39 | 41.30 | 36.76 |
| MobileNet-0.25 (0.3M) | MobileNet-1.0 (3.3M) | 42.45 | 41.89 | 41.76 | 34.10 |
| MobileNet-0.5 (0.8M) | MobileNet-1.0 (3.3M) | 36.76 | 35.61 | 35.45 | 34.10 |

Table 3

FIG. 7

Table 4

FIG. 8

| Output size | MobileNetV2-k $3 \times 3, 32k$ |
|---|---|
| $112 \times 112$ | |
| $112 \times 112$ | bottleneck// = 1, c = 16k, n = 1 |
| $56 \times 56$ | bottleneck// = 6, c = 24k, n = 2 |
| $28 \times 28$ | bottleneck// = 6, c = 32k, n = 3 |
| $14 \times 14$ | bottleneck// = 6, c = 64k, n = 4 |
| $14 \times 14$ | bottleneck// = 6, c = 96k, n = 3 |
| $7 \times 7$ | bottleneck// = 6, c = 160k, n = 3 |
| $7 \times 7$ | bottleneck// = 6, c = 320k, n = 1 |
| $7 \times 7$ | $1 \times 1, 1280k$ |
| $1 \times 1$ | average pool, 47-d fc, softmax |

Table 5

FIG. 9

SYSTEM AND METHOD FOR KNOWLEDGE DISTILLATION BETWEEN NEURAL NETWORKS

CROSS-REFERENCE TO RELATED APPLICATIONS

This application claims priority from U.S. Provisional Patent Application No. 62/822,099 filed on Mar. 22, 2019, the entire contents of which are hereby incorporated by reference.

FIELD

This relates generally to the field of deep learning, and more particularly, knowledge distillation of neural networks for training a "student" neural network under the guidance of a trained "teacher" network.

BACKGROUND

Deep neural networks are being employed to solve an increasingly wide array of real-world problems such as vision problems. While the general trend in deep learning is towards deeper, wider, and more complex networks, deploying deep learning solutions in the real world requires a consideration of the computational cost. A mobile robot or self-driving vehicle, for example, has limited memory and power. Even when resources are abundant, such as when a vision system is hosted in the cloud, more resource-efficient deep networks mean more clients can be served at a lower cost.

SUMMARY

Resource consciousness has led to a recent increase in interest in efficient neural architectures [13, 14, 21, 28, 39], as well as in algorithms for compressing trained deep networks. Network compression methods generally fall into one of several categories. Weight pruning methods [11, 19, 20, 22, 29, 31, 35] remove unimportant connections from the network, resulting in a sparser network structure. Quantized networks [8, 15, 17, 26, 38, 41], such as fixed-point, binary, ternary, and arbitrary-bit networks, encode weights and/or activations using a small number of bits. Low-rank factorization methods [6, 7, 16, 24, 40] learn compact low-rank approximations of layer weight matrices. Knowledge distillation methods [12, 27, 34, 37] supervise the training of "student" networks by capturing and transferring the knowledge of more expensive "teacher" networks.

Network compression often requires specialized software or hardware support. For example, unstructured pruning requires optimized sparse matrix multiplication routines to realize practical acceleration [23], platform constraint-aware compression [2, 32, 33] requires hardware simulators or empirical measurements, and arbitrary-bit quantization [9, 17] requires specialized hardware. One of the attractive points of knowledge distillation is that it can be easily implemented in any off-the-shelf deep learning framework without the need for extra software or hardware. Knowledge distillation is also conceptually simple: the teacher network provides a richer supervisory signal than simple data supervision (e.g., one-hot vectors).

The conceptual simplicity of knowledge distillation belies the fact that how to best capture the knowledge of the teacher to train the student (i.e. how to define the distillation loss) remains an open question. In traditional knowledge distillation [12], the softened class predictions of the teacher are used as the extra supervisory signal: the distillation loss encourages the student to mimic the predictions of the teacher. FitNets [27] extend this idea by adding hints to guide the training of intermediate layers. In flow-based knowledge distillation [34], the extra supervisory signal comes from the inter-layer "flow"—how features are transformed between layers. The distillation loss encourages the student to mimic the teacher's flow matrices, which are derived from the inner product between feature maps in two layers, such as the first and last layers in a residual block. In attention transfer [37], the supervisory signal for knowledge distillation is in the form of spatial attention. Spatial attention maps are computed by summing the squared activations along the channel dimension. The distillation loss encourages the student to produce similar normalized spatial attention maps as the teacher, intuitively paying attention to similar parts of the image as the teacher.

Knowledge distillation is a general technique for training a 'student' neural network under the guidance of a trained 'teacher' network. In deep network compression, an expensive high-capacity teacher is distilled to train a compact student; in privileged learning, a teacher previously trained with privileged data is distilled to train a student without access to that data. Thus, the student is given only data that it has access to, while also benefiting from what the teacher already knows. The distillation loss determines how a teacher's knowledge is captured and transferred to the student. For example, a commonly adopted distillation loss guides the student to mimic the softened class predictions of the teacher.

A new knowledge distillation loss described herein is based on semantically similar inputs tending to elicit similar activation patterns (or intermediate outputs) in a trained network. Similarity-preserving knowledge distillation guides the training of a student network such that input pairs that produce similar (dissimilar) activations in the teacher network produce similar (dissimilar) activations in the student network. In contrast to previous distillation methods, the student is not required to mimic the representation space of the teacher, but rather to preserve the pairwise similarities in its own representation space. Experiments on three public datasets demonstrate the potential of the proposed approach.

According to an aspect, there is provided a knowledge distillation system for supervised training of a student network with a teacher network, the system comprising: a processor; a memory in communication with the processor, the memory storing instructions that, when executed by the processor cause the processor to: input a batch to the teacher network; input the batch to the student network; generate a teacher activation map at a layer of the teacher network; generate a student activation map at a layer of the student network corresponding to the layer of the teacher network; generate a pairwise teacher similarity matrix based on the teacher activation map; generate a pairwise student similarity matrix based on the student activation map; and minimize a knowledge distillation loss defined as a difference between the pairwise teacher similarity matrix and the pairwise student similarity matrix.

In some embodiments, the pairwise teacher similarity matrix is generated based at least in part on dot products of the teacher activation map.

In some embodiments, the pairwise student similarity matrix is generated based at least in part on dot products of the student activation map.

In some embodiments, the knowledge distillation loss is defined as a summation of a mean element-wise squared difference between the pairwise teacher similarity matrix and the pairwise student similarity matrix.

In some embodiments, the knowledge distillation loss penalizes differences in the L2-normalized outer products of the teacher network activation map and the student network activation map.

In some embodiments, the knowledge distillation loss $\mathcal{L}_{SP}$ is based on:

$$\mathcal{L}_{SP}(G_T, G_S) = \frac{1}{b^2} \sum_{(l,l') \in \mathcal{J}} \|G_T^{(l)} - G_S^{(l')}\|_F^2$$

where b is a size of the batch, $G_T$ is the pairwise teacher similarity matrix, $G_S$ is the pairwise student similarity matrix, $\mathcal{J}$ collects the (l, l') layer pairs of layer l of the teacher network and layer l' of the student network, and $\|\cdot\|_F$ is a Frobenius norm.

In some embodiments, the memory stores instructions that, when executed by the processor cause the processor to: minimize a total loss for training the student network, the total loss defined as a cross-entropy loss and a product of the knowledge distillation loss and a hyperparameter.

In some embodiments, the teacher network is trained with privileged data that is inaccessible to the student network.

In some embodiments, the layer of the teacher network and the layer of the student network correspond to a same depth.

In some embodiments, the layer of the teacher network and the layer of the teacher network are at an end of a same block.

According to another aspect, there is provided a method for supervised training of a student network with a teacher network, the method comprising: inputting a batch to the teacher network; inputting the batch to the student network; generating a teacher activation map at a layer of the teacher network; generating a student activation map at a layer of the student network corresponding to the layer of the teacher network; generating a pairwise teacher similarity matrix based on the teacher activation map; generating a pairwise student similarity matrix based on the student activation map; and minimizing a knowledge distillation loss defined as a difference between the pairwise teacher similarity matrix and the pairwise student similarity matrix.

In some embodiments, the generating the pairwise teacher similarity matrix is based at least in part on dot products of the teacher activation map.

In some embodiments, the generating the pairwise student similarity matrix is based at least in part on dot products of the student activation map.

In some embodiments, the knowledge distillation loss is defined as a summation of a mean element-wise squared difference between the pairwise teacher similarity matrix and the pairwise student similarity matrix.

In some embodiments, the knowledge distillation loss penalizes differences in the L2-normalized outer products of the teacher network activation map and the student network activation map.

In some embodiments, the knowledge distillation loss $\mathcal{L}_{SP}$ is based on:

$$\mathcal{L}_{SP}(G_T, G_S) = \frac{1}{b^2} \sum_{(l,l') \in \mathcal{J}} \|G_T^{(l)} - G_S^{(l')}\|_F^2$$

where b is a size of the batch, $G_T$ is the pairwise teacher similarity matrix, $G_S$ is the pairwise student similarity matrix, $\mathcal{J}$ collects the (l, l') layer pairs of layer l of the teacher network and layer l' of the student network, and $\|\cdot\|_F$ is a Frobenius norm.

In some embodiments, the method further comprises: minimizing a total loss for training the student network, the total loss defined as a cross-entropy loss and a product of the knowledge distillation loss and a hyperparameter.

In some embodiments, the teacher network is trained with privileged data that is inaccessible to the student network.

In some embodiments, the layer of the teacher network and the layer of the student network correspond to a same depth.

According to a further aspect, there is provided a non-transitory computer readable medium comprising a computer readable memory storing computer executable instructions thereon that when executed by a computer cause the computer to perform a method as described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

A novel method for knowledge distillation described herein is inspired by the observation that semantically similar inputs tend to elicit similar activation patterns in a trained neural network.

Figure 1A:
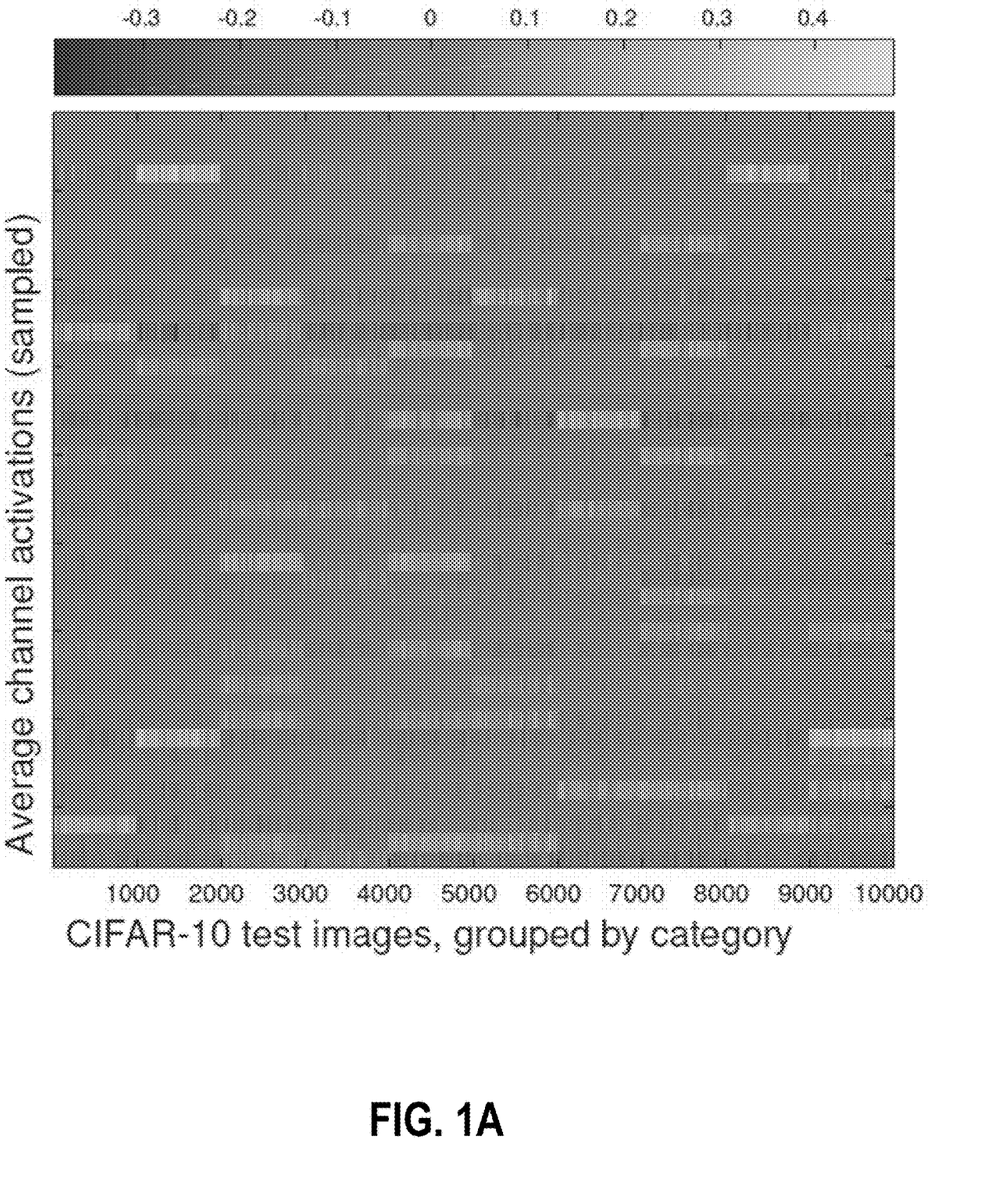
FIG. 1A is a visualization of activations from the last convolutional layer of a wide residual network, according to an embodiment.

FIG. 1A visualizes the average activation of each channel in the last convolutional layer of a WdeResNet-16-2 teacher network (herein, the standard notation WdeResNet-d-k refers to a wide residual network [36] with depth d and width multiplier k), on the CIFAR-10 test images.

As illustrated in FIG. 1A, images from the same object category tend to activate similar channels in the trained network. The similarities in activations across different images capture useful semantics learned by the teacher network.

As disclosed herein, these similarities may provide an informative supervisory signal for knowledge distillation. If two input images elicit similar (dissimilar) activation patterns in the teacher, it may be desirable to guide the training of the student so that they also elicit similar (dissimilar) activation patterns in the student. In some embodiments, activations—intermediate outputs within neural network— should have similar patterns of activation between student and teacher.

Disclosed herein is a similarity-preserving knowledge distillation system 100, a novel knowledge distillation method (loss) uses the activation similarities within each input mini-batch to supervise the training of a student network with a trained teacher network.

Figure 1B:
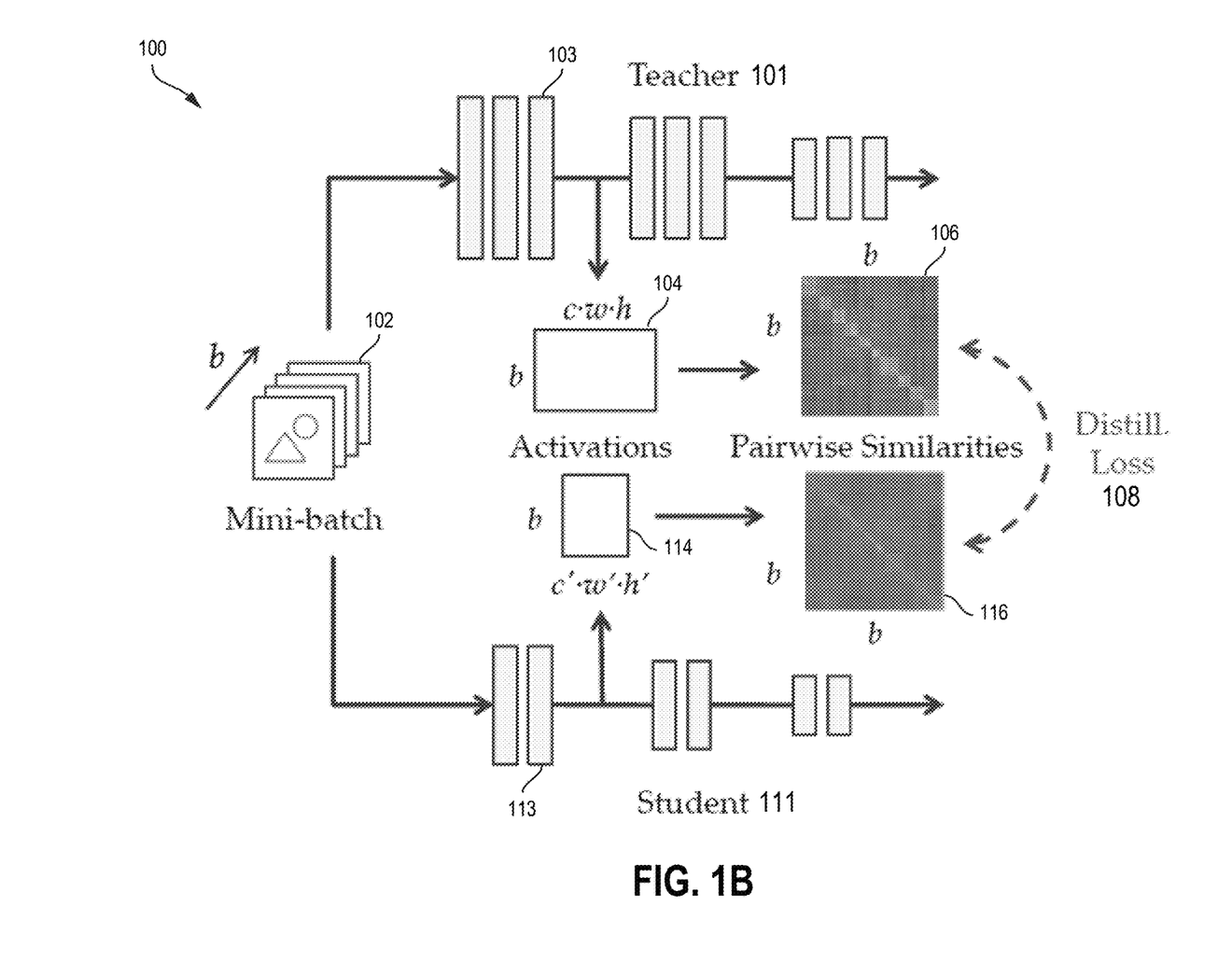
FIG. 1B is a schematic diagram of a similarity-preserving knowledge distillation system, according to an embodiment.

FIG. 1B illustrates similarity-preserving knowledge distillation system 100 to supervise training and transfer knowledge from a trained teacher network 101 to a student network 111, according to an embodiment. An input 102, in an example, a mini-batch of b images, is input to teacher network 101 and student network 111.

A teacher activation map 104 can be generated as output from a layer 103 of teacher network 101, where b is the batch size, c is the number of output channels, and h and w are spatial dimensions. A student activation map 112 can be generated as output from a corresponding layer 113 of student network 111, where b is the batch size, c' is the number of output channels, and h' and w' are spatial dimensions.

A pairwise teacher similarity matrix 106, a b×b matrix, can be computed from teacher activation map 104. A pairwise student similarity matrix 116, also a b×b matrix, can be computed from student activation map 114. The b×b matrices of pairwise teacher similarity matrix 106 and pairwise student similarity matrix 116 encode the similarities in the activations of the respective network (teacher network 101 and student network 111) as elicited by the images in the mini-batch of input 102.

A distillation loss 108 can be defined based on the pairwise similarity matrices 106, 116 produced by teacher network 101 and student network 111.

Distillation loss 108 may be validated in experiments on three public datasets. The experiments described herein show the potential of similarity preserving knowledge distillation, not only for improving the training outcomes of student networks, but also for complementing traditional methods for knowledge distillation.

A goal of knowledge distillation is to train student network 111 under the guidance of a trained teacher network 101, which acts as an extra source of supervision. Student network 111 is typically computationally cheaper than teacher 101: for example, it may be shallower, thinner, or composed of cheaper operations. Trained teacher network 101 provides additional semantic knowledge beyond the usual data supervision (e.g. the usual one-hot vectors for classification). The challenge addressed by system 100 is how to encode and transfer the knowledge of teacher 101 such that performance of student 111 is maximized.

As described herein and illustrated in FIG. 1A, semantically similar inputs tend to elicit similar activation patterns in a trained neural network. As shown in FIG. 1A, activation patterns may be largely consistent within the same object category and distinctive across different categories.

Correlations in activations may encode useful knowledge of teacher 101 that may be transferred to student 111. If two inputs of input 102 produce highly similar activations in teacher network 101 (for example, illustrated by teacher activation map 104), it may be beneficial to guide student network 111 towards a configuration that also results in the two inputs producing highly similar activations in the student 111 (for example, illustrated by student activation map 114). Conversely, if two inputs of input 102 produce dissimilar activations in teacher 101 (for example, illustrated by teacher activation map 104), it may be desirable for these inputs to produce dissimilar activations in student 111 as well (for example, illustrated by student activation map 114). This may be achieved by way of knowledge distillation system 100, described herein, and in some embodiments, defined by Equations (1) to (4), detailed below.

Given an input 102, for example, an input mini-batch, knowledge distillation system 100 denotes teacher activation map 104 produced by teacher network 101, defined as teacher network T, at a particular layer l (layer 103) by $A_T^{(l)} \in \mathbb{R}^{b \times c \times h \times w}$ where b is the batch size, c is the number of output channels, and h and w are spatial dimensions.

Knowledge distillation system 100 denotes student activation map 114 produced by student network 111, defined as student network S, at a corresponding layer l' (layer 113) as $A_S^{(l')} \in \mathbb{R}^{b \times c' \times h' \times w'}$. Note that c does not necessarily have to equal c', and likewise for the spatial dimensions, which may differ between teacher network 101 and student network 111. Similar to attention transfer [37], the corresponding layer l' can be the layer at the same depth as l if the student and teacher share the same depth, or the layer at the end of the same block if the student and teacher have different depths. In some embodiments, correspondence between layers may be hand coded. In some embodiments, there may be no notion of layers of correspondence. In some embodiments, there is an overall activation map and no layers.

For knowledge distillation system 100 to guide student 111 towards the activation correlations induced in the teacher 101, a distillation loss 108 may be defined that penalizes differences in the L2-normalized outer products of $A_T^{(l)}$ and $A_S^{(l')}$. First, let $$\tilde{G}_T^{(l)} = Q_T^{(l)} \cdot Q_T^{(l)T}; \quad G_{T[i,:]}^{(l)} = \tilde{G}_{T[i,:]}^{(l)} / \|\tilde{G}_{T[i,:]}^{(l)}\|_2 \quad (1)$$

where $Q_T^{(l)} \in \mathbb{R}^{b \times chw}$ is a reshaping of $A_T^{(l)}$, and therefore $\tilde{G}_T^{(l)}$ is a b×b matrix. entry (i,j) in $\tilde{G}_T^{(l)}$ encodes the similarity of the activations at this teacher layer elicited by the ith and jth images in the mini-batch. A row-wise L2 normalization can be applied to obtain $G_T^{(l)}$ where the notation [i,:] denotes the ith row in a matrix. Pairwise teacher similarity matrix 106, $G_T^{(l)}$, thus represents similarities at layer l in teacher network 101.

Analogously, for student network 111, let $$\tilde{G}_S^{(l')} = Q_S^{(l')} \cdot Q_S^{(l')T}; \quad G_{S[i,:]}^{(l')} = \tilde{G}_{S[i,:]}^{(l')} / \|\tilde{G}_{S[i,:]}^{(l')}\|_2 \quad (2)$$

where $Q_S^{(l')} \in \mathbb{R}^{b \times c'h'w'}$ is a reshaping of $A_S^{(l')}$, and pairwise student similarity matrix 116, $G_S^{(l')}$, is a b×b matrix.

A similarity-preserving knowledge distillation loss 108 of knowledge distillation system 100 may be defined as:

$$\mathcal{L}_{SP}(G_T, G_S) = \frac{1}{b^2} \sum_{(l,l') \in \mathcal{J}} \|G_T^{(l)} - G_S^{(l')}\|_F^2 \quad (3)$$

where $\mathcal{J}$ collects the (l, l') layer pairs (e.g. layers at the end of the same block, as discussed above) and $\|\cdot\|_F$ is the Frobenius norm. Equation (3) is a summation, over all (l, l') pairs, of the mean element-wise squared difference between the $G_T^{(l)}$ and $G_S^{(l')}$ matrices.

In some embodiments, a dissimilarity matrix may be generated for teacher activation map 104, and a dissimilarity matrix generated for student activation map 114, from which a distillation loss is defined based on the dissimilarity matrices.

Finally, the total loss for training the student network may be defined as:

$$\mathcal{L} = \mathcal{L}_{CE}(y, \sigma(z_S)) + \gamma \mathcal{L}_{SP}(G_T, G_S) \quad (4)$$

where $\mathcal{L}_{CE}$ denotes a cross-entropy loss and $\gamma$ is a balancing hyperparameter.

Knowledge distillation system 100 may be implemented as software and/or hardware, for example, in a computing device.

Figure 2:
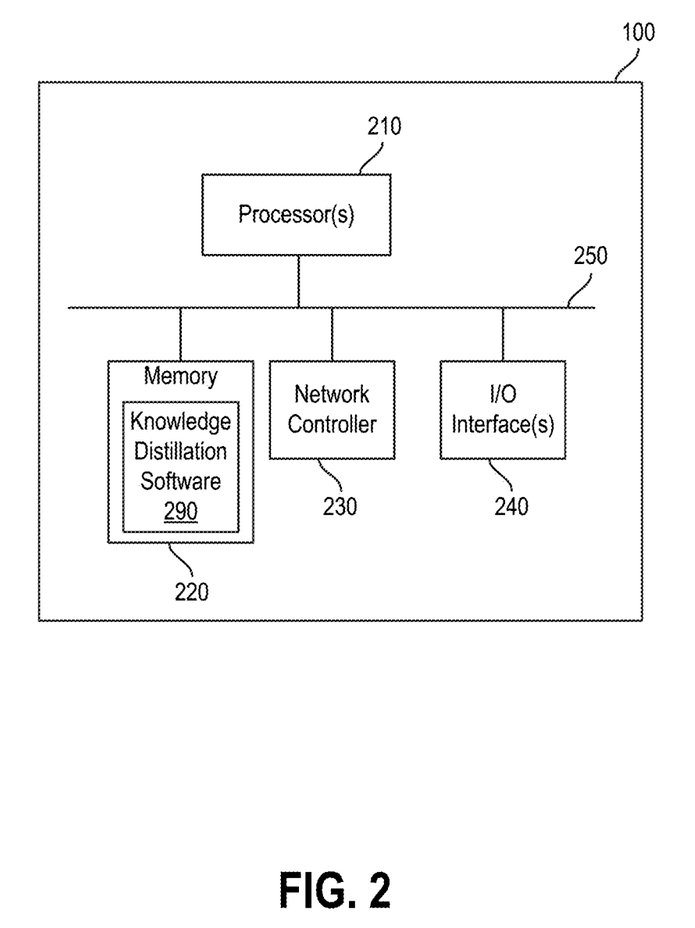
FIG. 2 is a block diagram of example hardware and software components of a computing device of knowledge distillation system, according to an embodiment.

FIG. 2 is a high-level block diagram of a computing device, exemplary of knowledge distillation system 100. Knowledge distillation system 100, under software control, may be used to train a student network by guiding the student network towards activation correlations induced in a teacher network.

As illustrated, knowledge distillation system 100, a computing device, includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of the computing device. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Example software components and data stored within memory 220 of knowledge distillation system 100 may include knowledge distillation software 290, a dataset data storage (not shown), a teacher neural network (not shown), a student neural network (not shown), and operating system (OS) software (not shown).

Knowledge distillation software 290 in memory 220 may perform knowledge distillation to guide a student network towards activation correlations induced in a teacher network.

Figure 3:
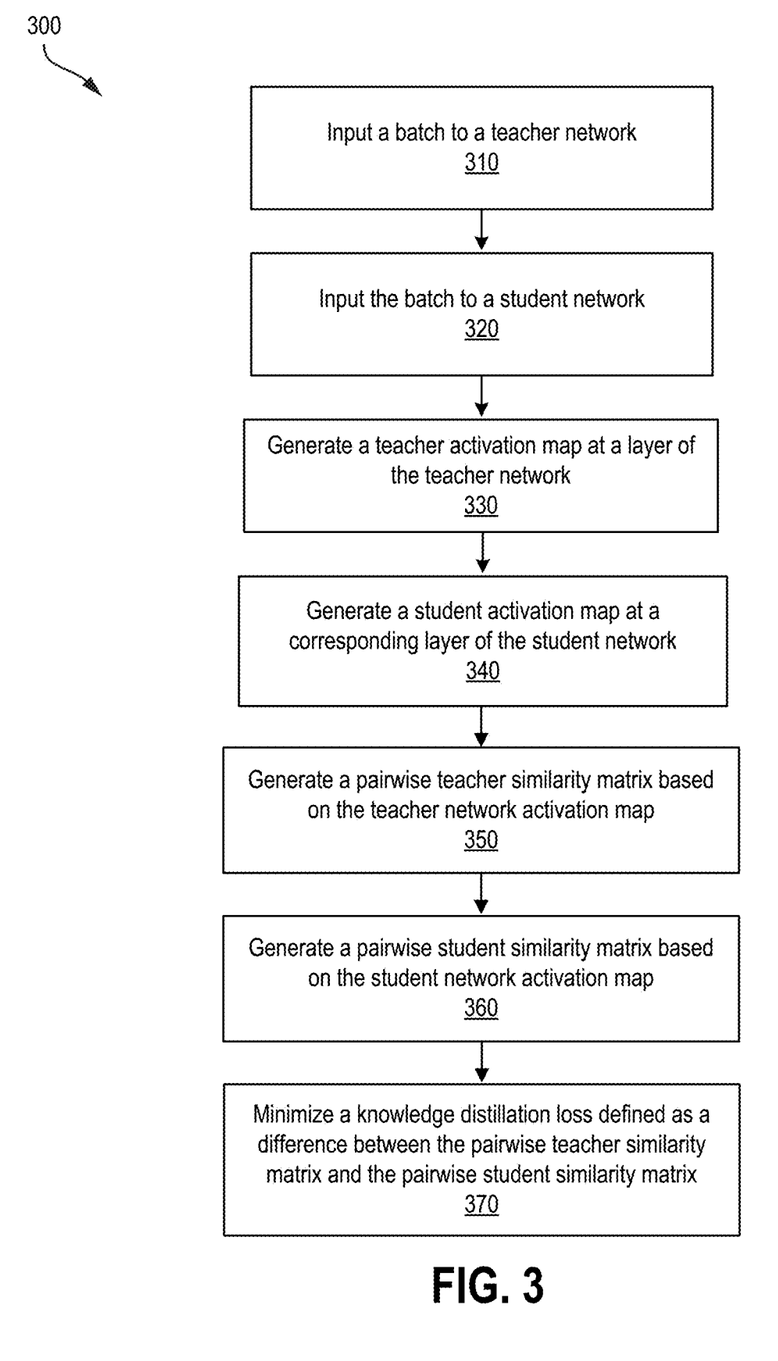
FIG. 3 is a flow chart of a method for knowledge distillation to guide a student network towards activation correlations induced in a teacher network, performed by the software of FIG. 2, according an embodiment.

FIG. 3 illustrates a method 300 for knowledge distillation to guide a student network towards activation correlations induced in a teacher network, according to an embodiment. Blocks 310 to 370 may be performed by processor(s) 210. The steps are provided for illustrative purposes. Variations of the steps, omission or substitution of various steps, or additional steps may be considered.

At block 310, processor(s) 210 input a batch, such as mini-batch of b images of input 102, to teacher network 101.

At block 320, processor(s) 210 input the batch to student network 111.

At block 330, processor(s) 210 generate teacher activation map 104 at layer l 103 of teacher network 101, for example, as defined by $A_T^{(l)}$, above.

At block 340, processor(s) 210 generate student activation map 114 at corresponding layer l' 113 of student network 111, for example, as defined by $A_S^{(l')}$, above.

At block 350, processor(s) 210 generate pairwise teacher similarity matrix 106 based on teacher activation map 104.

In some embodiments, pairwise teacher similarity matrix 106 is generated based at least in part on dot products of teacher activation map 104, for example, as defined in Equation (1), above.

At block 360, processor(s) 210 generate pairwise student similarity matrix 116 based on student activation map 114.

In some embodiments, pairwise student similarity matrix 116 is generated based at least in part on dot products of student activation map 114, for example, as defined in Equation (2), above.

At block 370, processor(s) 210 minimize knowledge distillation loss 108 defined as a difference between pairwise teacher similarity matrix 106 and pairwise student similarity matrix 116.

In some embodiments, knowledge distillation loss 108 is defined as a summation of the mean element-wise squared difference between teacher similarity matrix 106 and student similarity matrix 116, for example, as defined in Equation (3), above.

In some embodiments, processor(s) 210 minimize a total loss for training the student network, the total loss defined as a cross-entropy loss and a product of the knowledge distillation loss and a hyperparameter, for example, as defined in Equation (4), above.

It should be understood that the blocks may be performed in a different sequence or in an interleaved or iterative manner.

Figure 4:
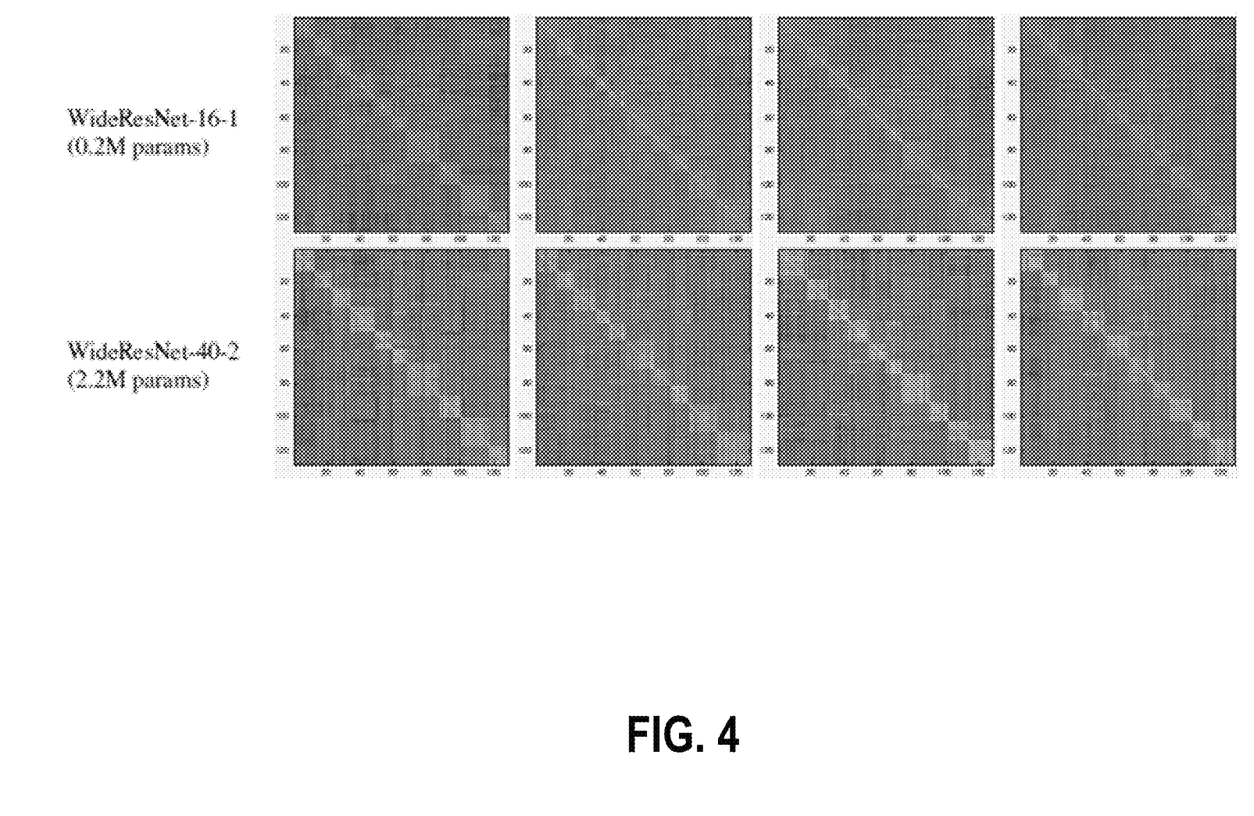
FIG. 4 illustrates activation similarity matrices produced for a student network in the top row and a teacher network in the bottom row, according to an embodiment.

FIG. 4 visualizes the G matrices for several batches (batch size b of 128 samples, thus generating a 128 by 128 matrix) in the CIFAR-10 test set. The top row of matrices is produced by a trained WideResNet-16-1 network (student network, generated by Equation (2)), consisting of 0.2M parameters, while the bottom row is produced by a trained WdeResNet-40-2 network (teacher network, generated by Equation (1)), consisting of 2.2M parameters.

In both cases, activations are collected from the last convolution layer. Each column represents a single batch, which is identical for both networks. The images in each batch have been grouped by their ground truth class for easier interpretability. The G matrices in both rows show a distinctive blockwise pattern, indicating that the activations at the last layer of these networks are largely similar within the same class and dissimilar across different classes (the blocks are differently sized because each batch has an unequal number of test samples from each class). Moreover, the blockwise pattern is more distinctive for the WideResNet-40-2 network, reflecting the higher capacity of this network to capture the semantics of the dataset.

Equation (3) pushes the student network towards producing G matrices closer to those produced by the teacher network. Previous distillation methods encourage the student to mimic the representation space of the teacher. The method disclosed herein is a departure from this general approach in that it aims to preserve the pairwise activation similarities of input samples. Its behavior is unchanged by a rotation of the teacher's representation space, for example. In similarity-preserving knowledge distillation, the student is not required to be able to express the representation space of the teacher, as long as pairwise similarities in the teacher space are well preserved in the student space.

Experimental validation of the proposed approach was performed on three public datasets. CIFAR-10 was used, as it is a commonly adopted dataset for comparing distillation methods, and its relatively small size allows multiple student and teacher combinations to be evaluated. The task of transfer learning was considered, and how distillation and fine-tuning can be combined to perform transfer learning on a texture dataset with limited training data was demonstrated. Finally, results were reported on a larger scale evaluation with the ImageNet32×32 dataset.

CIFAR-10 consists of 50,000 training images and 10,000 testing images at a resolution of 32×32. The dataset covers ten object classes, with each class having an equal number of images. Experiments were conducted using wide residual networks (WideResNets) [36] following [5, 37].

Figure 5:
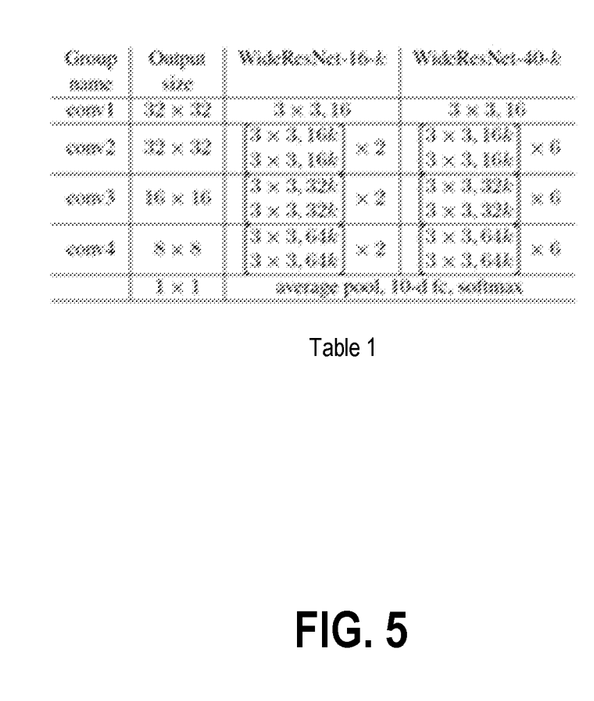
FIG. 5 is a table, illustrative of structures of WdeResNet networks used in CIFAR-10 experiments, according to an embodiment.

As shown in FIG. 5, Table 1 summarizes the structure of WideResNet networks used in CIFAR-10 experiments. Downsampling is performed by strided convolutions in the first layers of conv3 and conv4. Standard protocol [36] for training wide residual networks on CIFAR-10 (SGD with Nesterov momentum; 200 epochs; batch size of 128; and an initial learning rate of 0.1, decayed by a factor of 0.2 at epochs 60, 120, and 160) was adopted. Standard horizontal flip and random crop data augmentation was applied. Baseline comparisons with respect to traditional knowledge distillation (softened class scores) and attention transfer were performed. For traditional knowledge distillation [12], a=0.9 and T=4 were set following the CIFAR-10 experiments in [5, 37]. Attention transfer losses were applied for each of the three residual block groups. The weight of the distillation loss in attention transfer and similarity-preserving distillation was set by held-out validation on a subset of the training set ($\beta$=1000 for attention transfer, y=3000 for similarity-preserving distillation).

Figure 6:
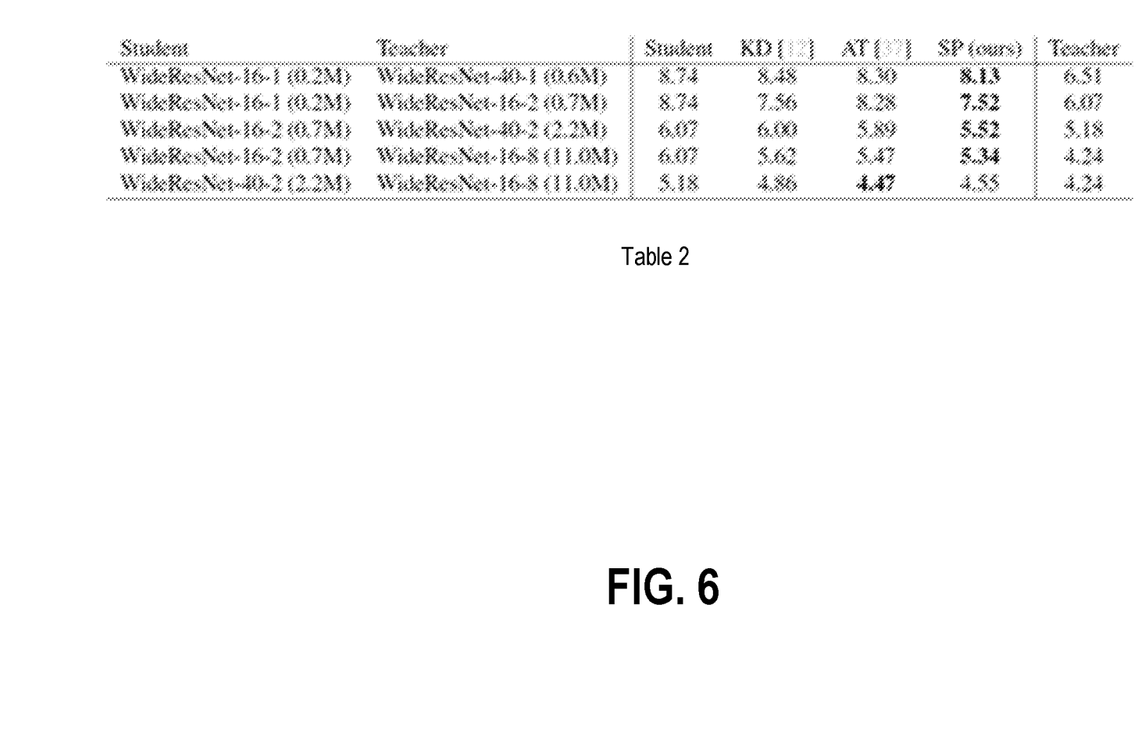
FIG. 6 is a table, illustrative of experimental results, according to some embodiments.

As shown in FIG. 6, Table 2 shows results experimenting with several student-teacher network pairs. Table 2 summarizes experiments on CIFAR-10 performed with three different knowledge distillation losses: softened class predictions (traditional KD), attention transfer (AT), and similarity preserving (SP). The median error over five runs is reported. The best result for each experiment is shown in bold. Brackets indicate model size in number of parameters. Cases were tested in which the student and teacher networks have the same width but different depth (WideResNet-16-1 student with WideResNet-40-1 teacher; WideResNet-16-2 student with WideResNet-40-2 teacher), the student and teacher networks have the same depth but different width (WideResNet-16-1 student with WideResNet-16-2 teacher; WideResNet-16-2 student with WideResNet-16-8 teacher), and the student and teacher have different depth and width (WideResNet-40-2 student with WideResNet-16-8 teacher).

In all cases, transferring the knowledge of the teacher network using similarity-preserving distillation improved student training outcomes. Compared to conventional training with data supervision (i.e. one-hot vectors), the student network consistently obtained lower error, from 0.5 to 1.2 absolute percentage points, or 7% to 14% relative, with no additional network parameters or operations. Similarity-preserving distillation also performed favorably with respect to the traditional (softened class scores) and attention transfer baselines, achieving the lowest error in four of the five cases. This validates that the activation similarities across images encode useful semantics learned by the teacher network, and may provide an effective supervisory signal for knowledge distillation.

While the results are presented from the perspective of improving the training of a student network, it is also possible to view the results from the perspective of the teacher network. The results suggest the potential for using similarity-preserving distillation to compress large networks into more resource-efficient ones with minimal accuracy loss. In the fifth test, for example, the knowledge of a trained WideResNet-16-8 network, which contains 11.0M parameters, is distilled into a much smaller WdeResNet-40-2 network, which contains only 2.2M parameters; this is a 5× compression rate with only 0:3% loss in accuracy.

The above similarity-preserving distillation results were produced using only the activations collected from the last convolution layers of the student and teacher networks. Experiments were also performed using the activations at the end of each WideResNet block, but found no improvement in performance. Therefore activations at the final convolution layers were used in subsequent experiments. Activation similarities may be less informative in the earlier layers of the network because these layers encode more generic features, which tend to be present across many images. Progressing deeper in the network, the channels encode increasingly specialized features, and the activation patterns of semantically similar images become more distinctive.

Transfer learning scenarios in computer vision can be explored using knowledge distillation system 100. Faced with a novel recognition task in a specialized image domain with limited training data, a strategy to adopt is to transfer, for example, using knowledge distillation system 100, the knowledge of a network pre-trained on ImageNet (or another suitable large-scale dataset) to the new recognition task by fine-tuning.

Figure 8:
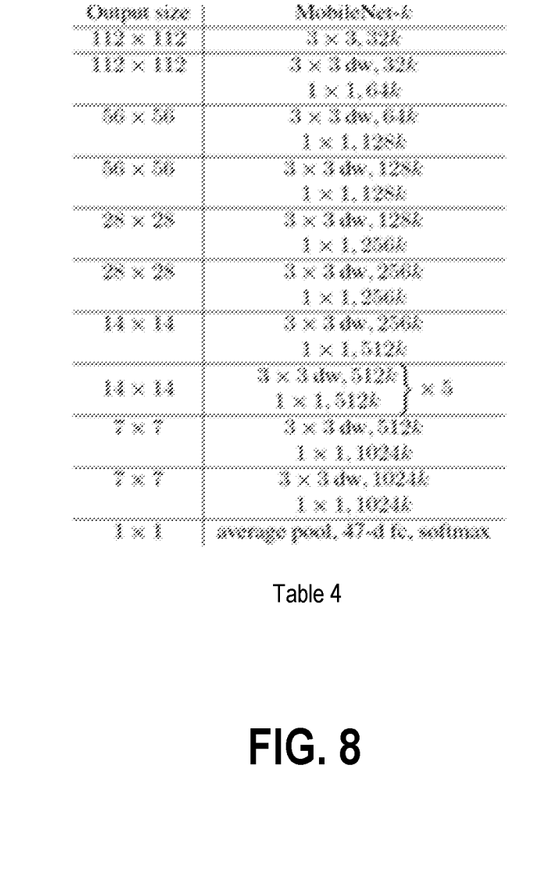
FIG. 8 is a table, illustrative of structures of MobileNet networks used in transfer learning experiments, according to an embodiment.
Figure 9:
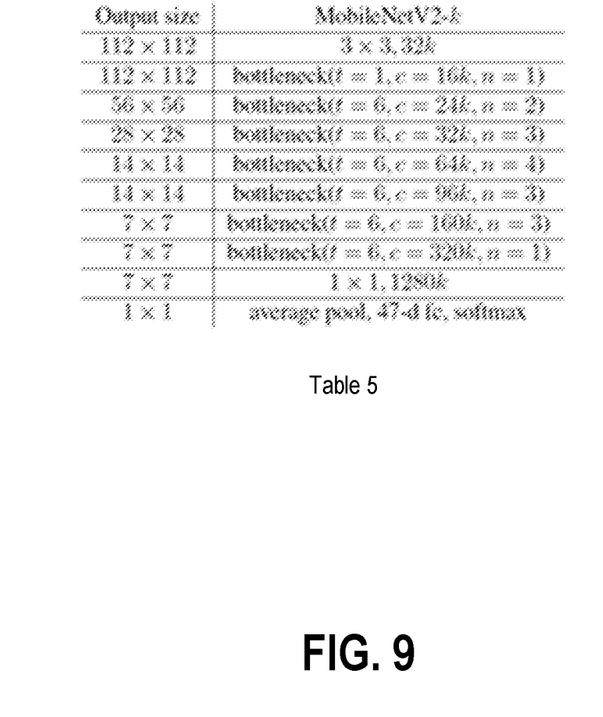
FIG. 9 is a table, illustrative of structures of MobileNetV2 networks used in transfer learning experiments, according to embodiments.

Knowledge distillation may be combined with fine-tuning: the student network is initialized with source domain (in this case, ImageNet) pretrained weights, and then the student is fine-tuned to the target domain using both distillation and cross-entropy losses (Equation (4)). This scenario was analyzed using the describable textures dataset [4], which is composed of 5,640 images covering 47 texture categories. Image sizes range from 300×300 to 640×640. ImageNet-style data augmentation was applied with horizontal flipping and random resized cropping during training. At test time, images were resized to 256×256 and center cropped to 224×224 for input to the networks. For evaluation, the standard ten training-validation-testing splits were adopted. To demonstrate the versatility of the method on different network architectures, and in particular its compatibility with mobile-friendly architectures, variants of MobileNet [13] were experimented with. As shown in FIG. 8, Table 4 summarizes the structure of MobileNet networks used in transfer learning experiments. 'dw' denotes depthwise convolution. Downsampling is performed by strided 3×3 depthwise convolutions. Table 5 of FIG. 9 summarizes the structure of MobileNetV2 networks used in transfer learning experiments. The notation tottleneck(t, c, n)' denotes a group of bottleneck residual block with expansion factor t, c output channels, and n repeated blocks. Downsampling is performed by strided 3×3 depthwise convolution in the first block of a croup.

A comparison was made with an attention transfer baseline. Softened class score based distillation is not directly comparable in this setting because the classes in the source and target domains are disjoint. The teacher would first have to be fine-tuned to the target domain, which significantly increases training time and may not be practical when employing expensive teachers or transferring to large datasets. Similarity-preserving distillation can be applied directly to train the student, without first fine-tuning the teacher, since it aims to preserve similarities instead of mimicking the teacher's representation space. The hyperparameters for attention transfer and similarity-preserving distillation were set by held-out validation on the ten standard splits. All networks were trained using SGD with Nesterov momentum, a batch size of 96, and for 60 epochs with an initial learning rate of 0.01 reduced to 0.001 after 30 epochs.

Figure 7:
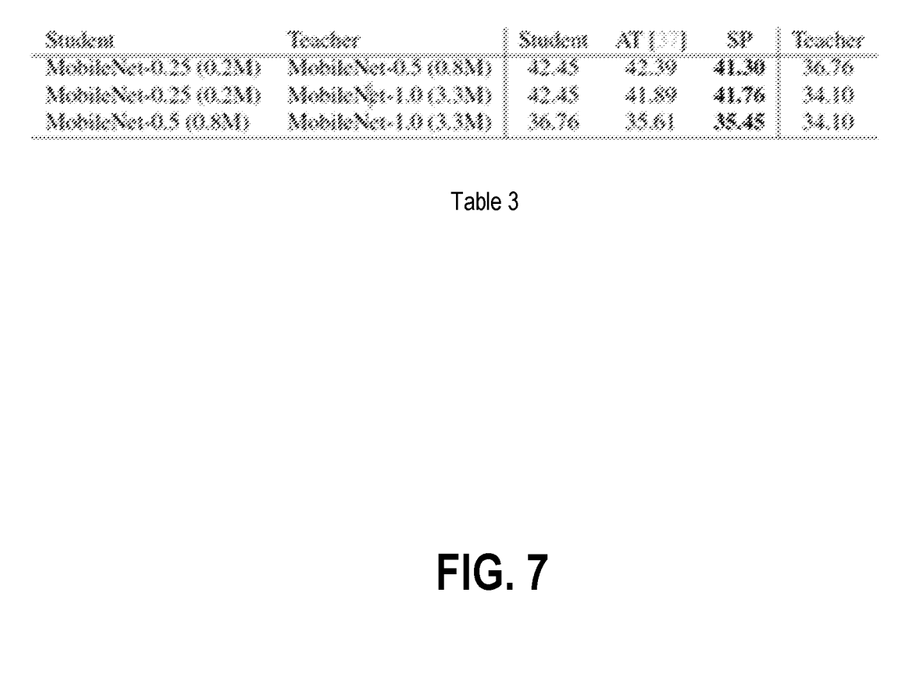
FIG. 7 is a table, illustrative of experimental results, according to some embodiments.

As shown in FIG. 7, Table 3 shows that similarity-preserving distillation can effectively transfer knowledge across different domains. Table 3 summarizes transfer learning experiments on the describable textures dataset with attention transfer (AT) and similarity preserving (SP) knowledge distillation. The median error over the ten standard splits is reported. The best result for each experiment is shown in bold. Brackets indicate model size in number of parameters. For all student-teacher pairs tested, applying similarity-preserving distillation during fine-tuning resulted in lower student error than fine-tuning without distillation. Fine-tuning MobileNet-0.25 with distillation reduced the error by 1.1% absolute, and finetuning MobileNet-0.5 with distillation reduced the error by 1.3% absolute, compared to fine-tuning without distillation. In addition, similarity-preserving distillation consistently outperformed spatial attention transfer, suggesting that there may be a domain shift in the important image areas for the network to attend. Similarity-preserving distillation may be more robust to changes in the image domain than learned spatial attention.

ImageNet32×32 [3] is a 32×32 downsampled version of ImageNet. It contains all the images and classes of the standard ImageNet benchmark, and follows the same split into 1.2 million training samples and 50,000 validation samples. The reduced resolution allows multiple student and teacher models to be trained more quickly for experimentation.

In addition to the knowledge capture (or loss definition) aspect of distillation, another important aspect is the architectural design of students and teachers. In most studies of knowledge distillation, the student network is a thinner and/or shallower version of the teacher network. Inspired by efficient architectures such as MobileNet [13] and ShuffleNet [39], Crowley et al. [5] proposed to replace regular convolutions in the teacher network with cheaper grouped and pointwise convolutions in the student. Ashok et al. [1] developed a reinforcement learning approach to learn the student architecture. Polino et al. [25] demonstrated how a quantized student network can be trained using a full-precision teacher network.

There is also innovative orthogonal work exploring alternatives to the usual student-teacher training paradigm. Wang et al. [30] introduced an additional discriminator network, and trained the student, teacher, and discriminator networks together using a combination of distillation and adversarial losses. Lan et al. [18] proposed the on-the-fly native ensemble teacher model, in which the teacher is trained together with multiple students in a multi-branch network architecture. The teacher prediction is a weighted average of the branch predictions. More broadly, the work described herein falls under the umbrella of deep network compression techniques, which also include weight pruning, quantization, and low-rank factorization methods. Weight pruning methods [11, 19, 20, 22, 29, 31, 35] remove unimportant weights from the network, sparsifying the network connectivity structure. The induced sparsity is unstructured when individual connections are pruned, or structured when entire channels or filters are pruned. Unstructured sparsity usually results in better accuracy but requires specialized sparse matrix multiplication libraries [23] or hardware engines [10] in practice. Quantization methods [8, 15, 17, 26, 38, 41] encode each weight in the network using a small number of bits, or at lower precision. At the extreme, weights in binary and ternary networks are encoded using only one or two bits, respectively. With specialized hardware, fractional quantization [9, 17] is possible by encoding individual weights at different precisions, allowing multiple precisions to be used within a single network layer. Low-rank factorization methods [6, 7, 16, 24, 40] produce compact low-rank approximations of filter matrices. Techniques from different categories have also been optimized jointly or combined sequentially to achieve higher compression rates [7, 11, 29]. State-of-the-art network compression methods can achieve significant reductions in network size, in some cases by an order of magnitude, but often require specialized software or hardware support. One of the advantages of knowledge distillation is that it may be easily realizable using off-the-shelf deep learning frameworks without any auxiliary support. Moreover, distillation can complement other network compression techniques which may provide further gains in performance [25].

The similarity-preserving knowledge distillation loss disclosed herein, embodied in an example, based on Equation (3), is defined in terms of activations instead of class scores as in traditional distillation. Traditional distillation methods encourage the student to mimic different aspects of the representation space of the teacher.

Conveniently, systems and methods disclosed herein for knowledge distillation instead aim to preserve the pairwise activation similarities of input samples. Knowledge distillation behavior is unchanged by a rotation of the teacher's representation space, for example. In similarity-preserving knowledge distillation as disclosed herein, the student is not required to be able to express the representation space of the teacher, as long as pairwise similarities in the teacher space are well preserved in the student space.

Systems and methods for knowledge distillation as described herein may be particularly suitable for transferring knowledge in a network trained using privileged data, for example, real-time reinforcement learning in real-world capital markets for order execution, such as to distribute a sell order over the course of a day so as to not impact the markets too much. Such a reinforcement learning neural network may be trained using privileged data. It may be desirable to develop extensions to such a network, without access to the privileged data that the network has been trained on. Thus, such a reinforcement learning model may be suitable as a teacher network in the systems and methods for knowledge distillation as disclosed herein, and be configured to transfer its knowledge, trained on privileged data, to a student network that does not have access to that data. A knowledge transfer performed by way of training the student network with the teacher network may be performed using public non-privileged data as an input to each of the teacher network and student network, as described herein.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

REFERENCES

[1] A. Ashok, N. Rhinehart, F. Beainy, and K. M. Kitani. N2N learning: Network to network compression via policy gradient reinforcement learning. In International Conference on Learning Representations, 2018.

[2] C. Chen, F. Tung, N. Vedula, and G. Mori. Constraint-aware deep neural network compression. In European Conference on Computer Vision, 2018.

[3] P. Chrabaszcz, I. Loshchilov, and F. Hutter. A down-sampled variant of ImageNet as an alternative to the CIFAR datasets. arXiv:1707.08819, 2017.

[4] M. Cimpoi, S. Maji, I. Kokkinos, S. Mohamed, and A. Vedaldi. Describing textures in the wild. In IEEE Conference on Computer Vision and Pattern Recognition, 2014.

[5] E. J. Crowley, G. Gray, and A. Storkey. Moonshine: Distilling with cheap convolutions. In Advances in Neural Information Processing Systems, 2018.

[6] E. Denton, W. Zaremba, J. Bruna, Y. LeCun, and R. Fergus. Exploiting linear structure within convolutional networks for efficient evaluation. In Advances in Neural Information Processing Systems, 2014.

[7] A. Dubey, M. Chatterjee, and N. Ahuja. Coreset-based neural network compression. In European Conference on Computer Vision, 2018.

[8] J. Faraone, N. Fraser, M. Blott, and P. H. W. Leong. SYQ: Learning symmetric quantization for efficient deep neural networks. In IEEE Conference on Computer Vision and Pattern Recognition, 2018.

[9] J. Fromm, S. Patel, and M. Philipose. Heterogeneous bitwidth binarization in convolutional neural networks. In Advances in Neural Information Processing Systems, 2018.

[10] S. Han, X. Liu, H. Mao, J. Pu, A. Pedram, M. A. Horowitz, and W. J. Dally. EIE: Efficient inference engine on compressed deep neural network. In ACM/IEEE International Symposium on Computer Architecture, 2016.

[11] S. Han, H. Mao, and W. J. Dally. Deep compression: Compressing deep neural networks with pruning, trained quantization and Huffman coding. In International Conference on Learning Representations, 2016.

[12] G. Hinton, O. Vinyals, and J. Dean. Distilling the knowledge in a neural network. arXiv:1503.02531, 2015.

[13] A. G. Howard, M. Zhu, B. Chen, D. Kalenichenko, W. Wang, T. Weyand, M. Andreetto, and H. Adam. MobileNets: Efficient convolutional neural networks for mobile vision applications. arXiv:1704.04861, 2017.

[14] F. N. Iandola, S. Han, M. W. Moskewicz, K. Ashraf, W. J. Dally, and K. Keutzer. SqueezeNet: AlexNet-level accuracy with 50×fewer parameters and <0.5 mb model size. arXiv:1602.07360, 2016. 1

[15] B. Jacob, S. Kligys, B. Chen, M. Zhu, M. Tang, A. Howard, H. Adam, and D. Kalenichenko. Quantization and training of neural networks for efficient integer-arithmetic-only inference. In IEEE Conference on Computer Vision and Pattern Recognition, 2018.

[16] M. Jaderberg, A. Vedaldi, and A. Zisserman. Speeding up convolutional neural networks with low rank expansions. In British Machine Vision Conference, 2014.

[17] S. Khoram and J. Li. Adaptive quantization of neural networks. In International Conference on Learning Representations, 2018.

[18] X. Lan, X. Zhu, and S. Gong. Knowledge distillation by on-the-fly native ensemble. In Advances in Neural Information Processing Systems, 2018.

[19] Z. Liu, J. Xu, X. Peng, and R. Xiong. Frequency-domain dynamic pruning for convolutional neural networks. In Advances in Neural Information Processing Systems, 2018.

[20] J.-H. Luo, J. Wu, and W. Lin. ThiNet: A filter level pruning method for deep neural network compression. In IEEE International Conference on Computer Vision, 2017.

[21] N. Ma, X. Zhang, H.-T. Zheng, and J. Sun. Shufflenet v2: Practical guidelines for efficient cnn architecture design. In European Conference on Computer Vision, 2018.

[22] S. Narang, G. Diamos, S. Sengupta, and E. Elsen. Exploring sparsity in recurrent neural networks. In International Conference on Learning Representations, 2017.

[23] J. Park, S. Li, W. Wen, P. Tang, H. Li, Y. Chen, and P. Dubey. Faster CNNs with direct sparse convolutions and guided pruning. In International Conference on Learning Representations, 2017.

[24] B. Peng, W. Tan, Z. Li, S. Zhang, D. Xie, and S. Pu. Extreme network compression via filter group approximation. In European Conference on Computer Vision, 2018.

[25] A. Polino, R. Pascanu, and D. Alistarh. Model compression via distillation and quantization. In International Conference on Learning Representations, 2018.

[26] M. Rastegari, V. Ordonez, J. Redmon, and A. Farhadi. XNOR-Net: ImageNet classification using binary convolutional neural networks. In European Conference on Computer Vision, 2016.

[27] A. Romero, N. Ballas, S. E. Kahou, A. Chassang, C. Gatta, and Y. Bengio. FitNets: hints for thin deep nets. In International Conference on Learning Representations, 2015.

[28] M. Sandler, A. Howard, M. Zhu, A. Zhmoginov, and L.-C. Chen. MobileNetV2: Inverted residuals and linear bottlenecks. In IEEE Conference on Computer Vision and Pattern Recognition, 2018.

[29] F. Tung and G. Mori. CLIP-Q: Deep network compression learning by in-parallel pruning-quantization. In IEEE Conference on Computer Vision and Pattern Recognition, 2018.

[30] X. Wang, R. Zhang, Y. Sun, and J. Qi. KDGAN: Knowledge distillation with generative adversarial networks. In Advances in Neural Information Processing Systems, 2018.

[31] W. Wen, C. Wu, Y. Wang, Y. Chen, and H. Li. Learning structured sparsity in deep neural networks. In Advances in Neural Information Processing Systems, 2016.

[32] T.-J. Yang, Y.-H. Chen, and V. Sze. Designing energy-efficient convolutional neural networks using energy-aware pruning. In IEEE Conference on Computer Vision and Pattern Recognition, 2017.

[33] T.-J. Yang, A. Howard, B. Chen, X. Zhang, A. Go, M. Sandle, V. Sze, and H. Adam. NetAdapt: Platform-aware neural network adaptation for mobile applications. In European Conference on Computer Vision, 2018.

[34] J. Yim, D. Joo, J. Bae, and J. Kim. A gift from knowledge distillation: Fast optimization, network minimization and transfer learning. In IEEE Conference on Computer Vision and Pattern Recognition, 2017.

[35] R. Yu, A. Li, C.-F. Chen, J.-H. Lai, V. I. Morariu, X. Han, M. Gao, C.-Y. Lin, and L. S. Davis. NISP: Pruning networks using neuron importance score propagation. In IEEE Conference on Computer Vision and Pattern Recognition, 2018.

[36] S. Zagoruyko and N. Komodakis. Wide residual networks. In British Machine Vision Conference, 2016.

[37] S. Zagoruyko and N. Komodakis. Paying more attention to attention: Improving the performance of convolutional neural networks via attention transfer. In International Conference on Learning Representations, 2017.

[38] D. Zhang, J. Yang, D. Ye, and G. Hua. LQ-Nets: Learned quantization for highly accurate and compact deep neural networks. In European Conference on Computer Vision, 2018.

[39] X. Zhang, X. Zhou, M. Lin, and J. Sun. ShuffleNet: An extremely efficient convolutional neural network for mobile devices. In IEEE Conference on Computer Vision and Pattern Recognition, 2018.

[40] X. Zhang, J. Zou, X. Ming, K. He, and J. Sun. Efficient and accurate approximations of nonlinear convolutional networks. In IEEE Conference on Computer Vision and Pattern Recognition, 2015.

[41] A. Zhou, A. Yao, K. Wang, and Y. Chen. Explicit loss-error-aware quantization for low-bit deep neural networks. In IEEE Conference on Computer Vision and Pattern Recognition, 2018.

Applicant notes that the described embodiments and examples are illustrative and non-limiting. Practical implementation of the features may incorporate a combination of some or all of the aspects, and features described herein should not be taken as indications of future or existing product plans.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A knowledge distillation system for supervised training of a computer-implemented student network with a computer-implemented teacher network, the system comprising:
  a processor;
  a memory in communication with the processor, the memory storing instructions that, when executed by the processor cause the processor to:
    input a batch to the teacher network;
    input the batch to the student network;
    generate a teacher activation map at a layer of the teacher network;
    generate a student activation map at a layer of the student network corresponding to the layer of the teacher network;
    generate a pairwise teacher similarity matrix based on the teacher activation map;
    generate a pairwise student similarity matrix based on the student activation map;
    minimize a knowledge distillation loss defined as a difference between the pairwise teacher similarity matrix and the pairwise student similarity matrix, and
    train the student network based on the knowledge distillation loss.

2. The knowledge distillation system of claim 1, wherein the pairwise teacher similarity matrix is generated based at least in part on dot products of the teacher activation map.

3. The knowledge distillation system of claim 1, wherein the pairwise student similarity matrix is generated based at least in part on dot products of the student activation map.

4. The knowledge distillation system of claim 1, wherein the knowledge distillation loss is defined as a summation of a mean element-wise squared difference between the pairwise teacher similarity matrix and the pairwise student similarity matrix.

5. The knowledge distillation system of claim 1, wherein the knowledge distillation loss penalizes differences in the L2-normalized outer products of the teacher network activation map and the student network activation map.

6. The knowledge distillation system of claim 1, wherein the knowledge distillation loss $L_{SP}$ is based on:

$$\mathcal{L}_{SP}(G_T, G_S) = \frac{1}{b^2} \sum_{(l,l') \in \mathcal{J}} \|G_T^{(l)} - G_S^{(l')}\|_F^2$$

where b is a size of the batch, $G_T$ is the pairwise teacher similarity matrix, $G_S$ is the pairwise student similarity matrix, $\mathcal{J}$ collects the (l,l') layer pairs of layer l of the teacher network and layer l' of the student network, and $\|\bullet\|_F$ is a Frobenius norm.

7. The knowledge distillation system of claim 1, wherein the memory stores instructions that, when executed by the processor cause the processor to: minimize a total loss for training the student network, the total loss defined as a cross-entropy loss and a product of the knowledge distillation loss and a hyperparameter.

8. The knowledge distillation system of claim 1, wherein the teacher network is trained with privileged data that is inaccessible to the student network.

9. The knowledge distillation system of claim 1, wherein the layer of the teacher network and the layer of the student network correspond to a same depth.

10. The knowledge distillation system of claim 1, wherein the layer of the teacher network and the layer of the teacher network are at an end of a same block.

11. A method for supervised training of a computer-implemented student network with a computer-implemented teacher network, the method comprising:
  inputting a batch to the teacher network;
  inputting the batch to the student network;
  generating a teacher activation map at a layer of the teacher network;

generating a student activation map at a layer of the student network corresponding to the layer of the teacher network;
generating a pairwise teacher similarity matrix based on the teacher activation map;
generating a pairwise student similarity matrix based on the student activation map;
minimizing a knowledge distillation loss defined as a difference between the pairwise teacher similarity matrix and the pairwise student similarity matrix, and
training the student network based on the knowledge distillation loss.

12. The method of claim 11, wherein the generating the pairwise teacher similarity matrix is based at least in part on dot products of the teacher activation map.

13. The method of claim 11, wherein the generating the pairwise student similarity matrix is based at least in part on dot products of the student activation map.

14. The method of claim 11, wherein the knowledge distillation loss is defined as a summation of a mean element-wise squared difference between the pairwise teacher similarity matrix and the pairwise student similarity matrix.

15. The method of claim 11, wherein the knowledge distillation loss penalizes differences in the L2-normalized outer products of the teacher network activation map and the student network activation map.

16. The method of claim 11, wherein the knowledge distillation loss $L_{SP}$ is based on:

$$\mathcal{L}_{SP}(G_T, G_S) = \frac{1}{b^2} \sum_{(l,l') \in \mathcal{J}} \|G_T^{(l)} - G_S^{(l')}\|_F^2$$

where b is a size of the batch, $G_T$ is the pairwise teacher similarity matrix, $G_S$ is the pairwise student similarity matrix, $\mathcal{J}$ collects the (l,l') layer pairs of layer l of the teacher network and layer l' of the student network, and $\|\bullet\|_F$ is a Frobenius norm.

17. The method of claim 11, further comprising: minimizing a total loss for training the student network, the total loss defined as a cross-entropy loss and a product of the knowledge distillation loss and a hyperparameter.

18. The method of claim 11, wherein the teacher network is trained with privileged data that is inaccessible to the student network.

19. The method of claim 11, wherein the layer of the teacher network and the layer of the student network correspond to a same depth.

20. A non-transitory computer readable medium comprising a computer readable memory storing computer executable instructions thereon that when executed by a computer cause the computer to perform the method of claim 11.

* * * * *